(12) United States Patent
Jäger et al.

(10) Patent No.: US 9,073,159 B2
(45) Date of Patent: Jul. 7, 2015

(54) MACHINE TOOL ADAPTER TO REDUCE VIBRATIONS AND NOISE

(75) Inventors: Horst Manfred Jäger, Nuremberg (DE); Krishna Pappu, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 510 days.

(21) Appl. No.: 13/479,719

(22) Filed: May 24, 2012

(65) Prior Publication Data
US 2012/0301240 A1  Nov. 29, 2012

(30) Foreign Application Priority Data
May 26, 2011  (DE) .......................... 10 2011 102 563

(51) Int. Cl.
*B23B 29/04* (2006.01)
*B23Q 11/00* (2006.01)
*B23B 31/02* (2006.01)

(52) U.S. Cl.
CPC ........... *B23Q 11/0032* (2013.01); *Y10T 408/94* (2015.01); *Y10T 408/665* (2015.01); *Y10T 408/75* (2015.01); *B23B 29/04* (2013.01); *B23B 31/02* (2013.01); *B23C 2226/33* (2013.01); *B23C 2250/16* (2013.01)

(58) Field of Classification Search
CPC ....................................................... B23B 29/04
USPC .............................. 408/127, 143, 141; 279/16
See application file for complete search history.

(56) References Cited

U.S. PATENT DOCUMENTS

| | | | | |
|---|---|---|---|---|
| 671,447 A * | 4/1901 | Morgan et al. | .................. | 408/14 |
| 956,298 A * | 4/1910 | Cudahy | ......................... | 408/140 |
| 1,290,427 A * | 1/1919 | Velk | .............................. | 408/139 |
| 2,244,143 A * | 6/1941 | Dowler | ......................... | 192/66.2 |
| 2,547,518 A * | 4/1951 | Benjamin et al. | ............... | 279/16 |
| 2,570,752 A * | 10/1951 | Benjamin et al. | ............... | 279/16 |
| 2,791,433 A * | 5/1957 | Dodd | .............................. | 279/79 |
| 3,778,071 A * | 12/1973 | Buck | .............................. | 279/16 |
| 5,538,371 A * | 7/1996 | Kubo | ............................ | 408/139 |
| 5,915,892 A * | 6/1999 | Glimpel et al. | ............... | 408/141 |
| 6,047,621 A | 4/2000 | Dries et al. | | |
| 6,071,219 A * | 6/2000 | Cook | .................. | 483/1 |
| 6,082,236 A | 7/2000 | Andreassen | | |
| 2001/0056013 A1 * | 12/2001 | Cook | ........................... | 483/13 |
| 2003/0147712 A1 * | 8/2003 | Kai et al. | ..................... | 409/141 |
| 2003/0228199 A1 * | 12/2003 | Matsumoto et al. | .......... | 409/141 |
| 2007/0231092 A1 * | 10/2007 | Flam | ........................... | 408/141 |
| 2008/0260483 A1 * | 10/2008 | Cook | ........................... | 409/141 |
| 2009/0209356 A1 * | 8/2009 | Komine et al. | ............... | 470/103 |

FOREIGN PATENT DOCUMENTS

DE  689 02 953 T2  3/1993
DE  199 82 996 B4  3/2008

OTHER PUBLICATIONS

German Patent Office, "Official Action" (no English language translation available), Feb. 8, 2012, 5 pp.

* cited by examiner

*Primary Examiner* — Sunil K Singh
*Assistant Examiner* — Ryan Rufo
(74) *Attorney, Agent, or Firm* — Larry R. Meenan

(57) ABSTRACT

A tool adapter includes a holder structured to be attached to a machine tool and a tool receiver structured to receive a portion of a rotary cutting tool therein. The tool receiver being mounted in the holder so as to be rotatable to a limited extent. The tool receiver being mounted in the holder so as to be elastically resilient in the axial direction.

15 Claims, 4 Drawing Sheets

MACHINE TOOL ADAPTER TO REDUCE VIBRATIONS AND NOISE

This application claims priority to German application 10 2011 102 563.8 filed May 26, 2011, the contents of which are incorporated herein by reference.

BACKGROUND

1. Field of the Invention

The invention relates generally to tool adapters having a holder, which can be attached to a machine tool, and having a tool receiver, in which a tool can be received, in particular a drilling tool, the tool receiver being mounted on the holder so as to be rotatable to a limited extent.

2. Background Information

An example tool adapter for which the present invention improves upon is shown in U.S. Pat. No. 6,082,236. Here, the tool receiver is realized as a collar, which is rotatably mounted inside the holder by means of two bearing rings. Vulcanized-in between the outer surface of the tool receiver and the inner surface of the holder there is a rubber bushing, which limits the rotation of the tool receiver relative to the holder. A torque can be transmitted from the holder to the tool receiver via the rubber bushing, while, at the same time, vibrations that occur can be damped. In this way, it is also possible to reduce noise produced during the machining of a workpiece by means of a tool clamped in the tool receiver.

While useful for damping vibrations to a certain extent, there is still room for improvement in terms of vibration dampening capabilities over conventional tool adaptors.

SUMMARY OF THE INVENTION

The present invention provides a tool adapter of the type stated at the outset designed in such a way that improved vibration damping is achieved.

To achieve such improved vibration damping it is provided, according to the invention, that the tool receiver is mounted on the holder so as to be elastically resilient in the axial direction. This makes it possible also to damp vibrations occurring in the axial direction.

Preferably, an elastic element is provided between the tool receiver and an end face of the holder, such that the tool receiver is received in the holder so as to be elastically resilient in the axial direction. An elastic element, for example a disk or plate composed of rubber or an elastomer, enables the desired axial resilience to be obtained with little resource expenditure, while, at the same time, enabling a compact structural form to be achieved.

According to a preferred embodiment, it is provided that the tool receiver is disposed inside an opening of the holder, which opening is open at an end face of the holder. In this way, the tool receiver can be mounted inside the holder with little resource expenditure.

Preferably, it is provided that the tool receiver is realized as a bushing, which is mounted without play in the opening of the holder. Here, "without play" means a mounting that allows the desired movability in the circumferential direction (i.e. rotatable) and in the axial direction (i.e. displaceable) but, at the same time, ensures precise guiding of the tool receiver in the holder, in particular in respect of the center axis of the tool receiver. In other words, the guiding without play ensures that the tool receiver cannot become tilted or skewed inside the holder.

According to a preferred embodiment, provided on the end face of the holder there is a clamping element, which presses the tool receiver into the opening. The clamping element, which can be realized, for example, as a bearing contact disk, closes the opening in the axial direction, such that the tool receiver is reliably held inside the holder.

Preferably, in this case, disposed between the clamping element and the elastic element there is a bearing ring, by means of which the bias of the elastic element can be set. This makes it possible to apply a settable bias to the elastic element, which is responsible for damping in the axial direction, such that the tool adapter can be set to differing vibration frequencies. This can be effected in a technically simple manner, in that bearing rings of differing thicknesses are available, and the bearing ring that is suitable for the respective application is selected.

According to a preferred embodiment, a torque transmission element is provided, which acts positively between the tool receiver and the holder. This ensures a reliable transmission of torque from the holder to the tool receiver. Preferably, in this case, a damping element is provided, which acts in the circumferential direction between the tool receiver and the holder. The damping element ensures that vibrations acting in the circumferential direction are damped.

According to a design of the invention, it is provided that the damping element surrounds the torque transmission element in the manner of a ring. Such a design enables vibrations to be damped in both circumferential directions with little resource expenditure, while, at the same time, allowing the axial displacement of the tool receiver relative to the holder that is necessary for damping vibrations acting in the axial direction.

According to a design of the invention, it is provided that the torque transmission element is fixedly connected to the tool receiver in the circumferential direction and projects into a cutout in the holder whose dimensions, at least in the circumferential direction, are greater than the dimensions of the torque transmission element. Preferably, in this case, the damping element fills the space that remains between the torque transmission element and the edge of the cutout, so as to ensure that the torque transmission element is driven positively in the holder, the damping element being interposed.

The torque transmission element can be realized in the manner of a feather key, such that elongate side walls are available for the transmission of torque. Preferably, the torque transmission element is arranged so as to be settable, such that the bias exerted upon the damping element can be altered. This makes it possible for the damping characteristic in the circumferential direction also to be set according to the respective applications.

According to a design of the invention, it is provided in this case that the torque transmission element widens outwardly, such that it can exert a bias upon the damping element in the radial direction. In this way, the bias exerted upon the damping element can be set with little resource expenditure, namely, in that the torque transmission element can assume differing positions on the tool receiver in the radial direction.

According to a design of the invention, it is provided that the torque transmission element engages in a receiver in the tool receiver. The receiver defines a type of sliding seat, such that the torque transmission element is mechanically fixed in the circumferential direction, but can be set in the radial direction. The torque transmission element in this case is preferably screwed to the tool receiver. In this way, the torque transmission element can be reliably attached to the tool receiver, while, at the same time, it can be set in the radial direction.

Preferably, a plurality of torque transmission elements are provided, disposed in a distributed manner around the center axis of the tool adapter. For example, three or four torque transmission elements can be disposed at an angle of 120° or 90°, which reduces the load on each individual torque transmission element and increases the total service life of the tool adapter.

Preferably, it is provided that a sleeve is provided, which surrounds the holder on the outside. The sleeve serves, on the one hand, as protection against soiling and other influences. On the other hand, the sleeve serves as a support, in particular in the region of the torque transmission elements, so as to prevent the damping element from being displaced outward there.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
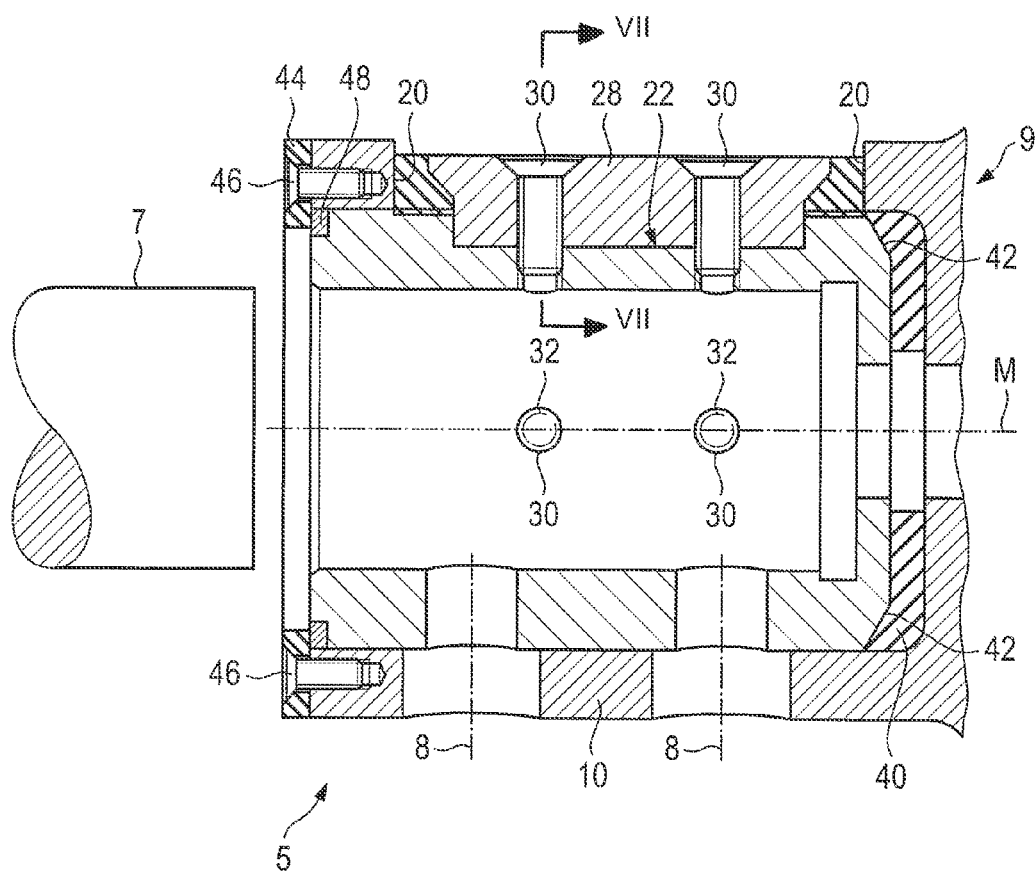
FIG. 1 shows a sectional view of a tool adapter according to the invention.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

FIG. 1 shows a tool adapter 5, which serves to receive a tool 7, indicated schematically, in particular a drilling tool. The drilling tool can be clamped in the tool adapter 5 by means of clamping means 8 (which are merely indicated). The tool adapter 5 is provided to be clamped into a machine tool via a connection side 9, such that the tool 7 can be driven, for example, made to rotate.

Figure 2:
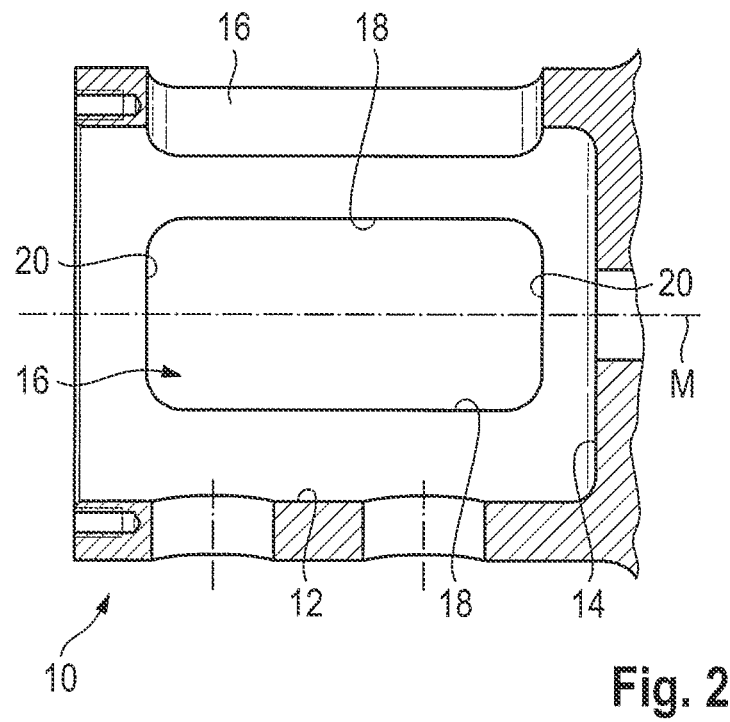
FIG. 2 shows a sectional view of the holder of the tool adapter from FIG. 1.
Figure 3:
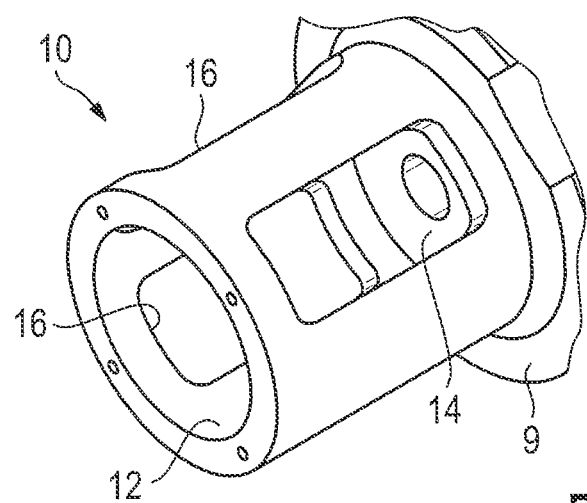
FIG. 3 shows a perspective view of the holder of FIG. 2.

The tool adapter 5 contains a holder 10 (see also FIGS. 2 and 3), which has a generally collar-type form, having a center axis M. The holder 10 is made of metal and, in its interior, has a cylindrical opening, such that a cylindrical inner surface 12 is constituted in the holder 10. The opening in the holder 10 is delimited, at the end that faces away from the end face, by a base surface 14, which is aligned perpendicularly in relation to the center axis M.

Disposed in the wall of the holder 10, distributed around the circumference, are a plurality of window-type cutouts 16, which have two lateral surfaces 18 opposite each other in the circumferential direction, and aligned parallel to each other and, perpendicular thereto, short end faces 20.

Figure 4:
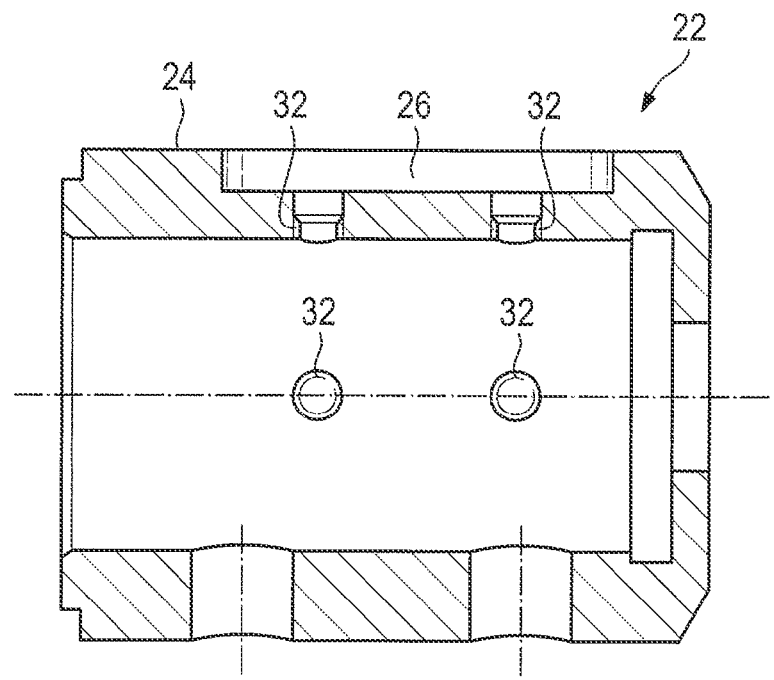
FIG. 4 shows a sectional view of the tool receiver of the tool adapter from FIG. 1.

Disposed inside the holder 10 is a tool receiver 22 (see, in particular, FIGS. 3 and 4), which is realized in the form of a collar and inside which the tool 7 can be disposed. The tool receiver 22 is likewise composed of metal, and has a cylindrical outer surface 24 whose dimensions are matched to the dimensions of the inner surface 12 of the holder 10 such that the tool receiver 22 is received without play inside the holder. "Without play" in this case means that the holder 10 defines the alignment of the tool receiver 22 in a precise manner, while, at the same time, the tool receiver can be rotated inside the holder 10.

Figure 5:
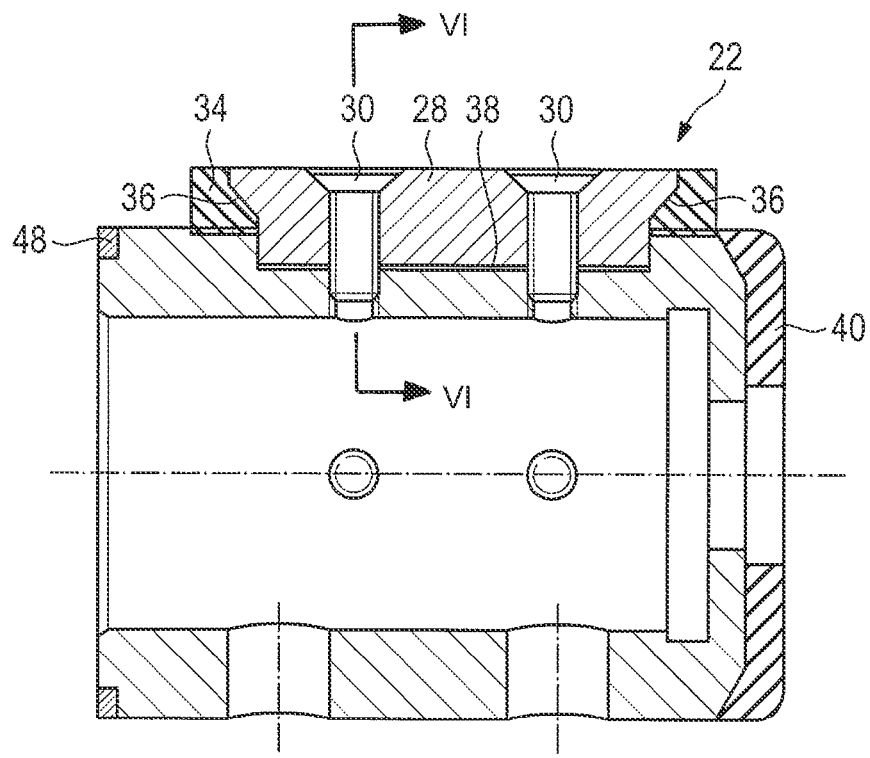
FIG. 5 shows a sectional view of the tool receiver of FIG. 4 with, attached thereto, a torque transmission element, a damping element and an elastic element.

On its outer surface the tool receiver 22 is provided with a plurality of receivers 26 (FIG. 4), which correspond to the cutouts 16 in the holder 10 and in each of which a torque transmission element 28 can be disposed, which is realized so as to be similar to a feather key (see, in particular, FIG. 5). Each torque transmission element 28 thus has an elongate form, whose longitudinal axis extends parallel to the center axis M, the radially inward lying portion engaging substantially without play in the receiver 26 in the tool receiver. For the purpose of fastening the torque transmission elements 28, respectively two setting screws 30 are provided, which can be screwed into threaded holes 32 in the tool receiver 22. When in the mounted state, the torque transmission elements 28 are located centrally in the cutouts 16 of the holder 10, the dimensions of the cutouts 16 being greater than the dimensions of the torque transmission elements 28.

Figure 6:
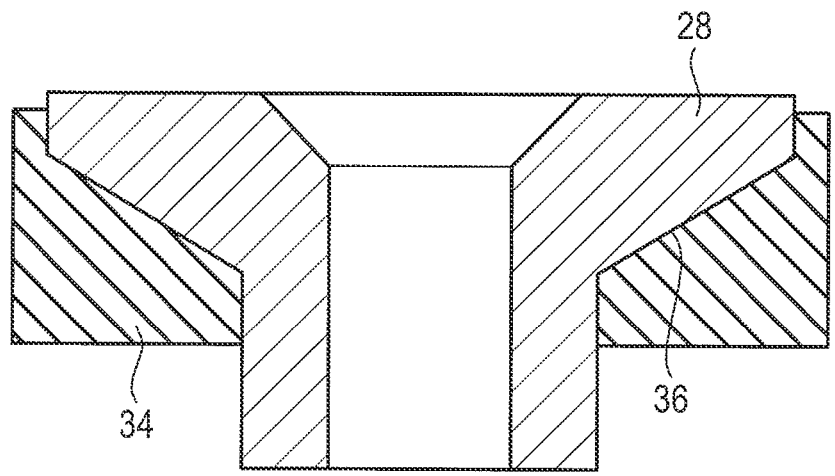
FIG. 6 shows a section along the plane VI-VI from FIG. 5.

For the purpose of damping vibrations in the circumferential direction, a plurality of damping elements 34 (FIGS. 5-7) are provided, which are each disposed around one of the torque transmission elements 28, and which are composed of rubber or an elastomer. The damping elements 34 are generally realized in the form of a ring, and completely fill the space between the torque transmission elements 28 and the walls 18, 20 of the cutouts 16. Even in their initial state, these damping elements have a certain bias. In addition, this bias can be set by means of the torque transmission elements 28.

For this purpose, it is provided that each torque transmission element 28 widens outwardly in the radial direction, in that projecting contact pressure surfaces 36 are provided. These contact pressure surfaces 36 extend around the entire circumference of the torque transmission element 28 and displace the damping element 34 radially inward and both in the circumferential direction and in the axial direction when the damping element is clamped inward in the radial direction, against the tool receiver 22, by means of the setting screws 30. The angle of the contact pressure surfaces 36 relative to the radially extending center axis of the torque transmission elements 28 is in the range from 15° to 75°, 45° being preferred.

Figure 7:
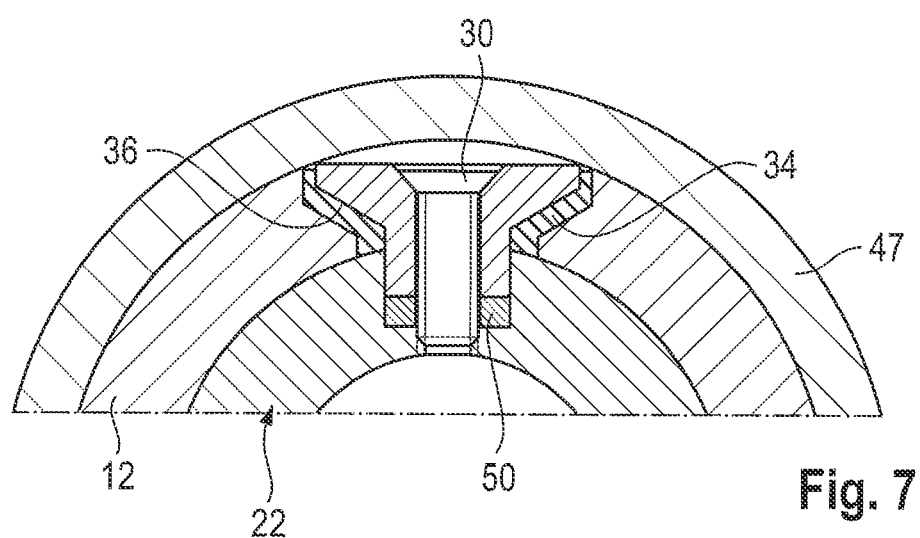
FIG. 7 shows an alternative design, in a section along the plane VII-VII from FIG. 1.

To enable a setting to be performed, in the initial state a gap 38 is provided between the underside of the torque transmission element 28 and the base of the receiver 26. When the setting screws 30 are screwed in further, the gap 38 is reduced, as a result of which the damping element 34 is pressed more firmly against the lateral surfaces 18 and the end faces 20 of the corresponding cutout 16. As can be seen in FIG. 7, shims 50 can also be disposed between the base of the receiver 26 and the torque transmission elements 28. This enables the bias of the damping elements 34 to be set.

For the purpose of damping in the axial direction, an elastic element 40 (see FIGS. 1 and 5), realized in the form of a disk or plate, is disposed between the base surface 14 of the opening of the holder 10 and the tool receiver 22. The elastic element 40 is thickened along its circumference, such that, in combination with a bevel 42 of the tool receiver 22, a wedge effect is achieved. The elastic element, likewise, is composed of rubber or elastomer.

Disposed on the end face of the holder 10 there is a clamping element 44, which is realized as a ring or bearing contact disk. This clamping element is attached to the end face of the holder 10, so as to be settable, by means of setting screws 46, the clamping element 44 being supported on the tool receiver 22 via a bearing ring 48. The setting screws 46 can be used to set the strength of bias of the elastic element 40 on the base surface 14 of the holder 10. The axial bias is set through differing thicknesses of the bearing ring 48.

As can be seen in the sectional view of the alternate embodiment of FIG. 7 in particular, disposed on the outside of the holder 10 there is a sleeve 47, which fixedly surrounds the holder. On the one hand, the sleeve 47 prevents soiling from accumulating in the region of the cutouts 16 and the torque transmission elements 28. On the other hand, the sleeve prevents the damping elements 34 from being displaced radially outward as loads occur. In other words, the sleeve 47 serves as a support for the damping elements 34.

When the tool 7 is to be driven, a torque is transmitted from the holder 10 to the tool receiver 22 and from there to the tool 7. Since the tool receiver 22 is elastically mounted inside the holder 10, vibrations that occur during machining performed by means of the tool 7 undergo extensive damping. On the one hand, this is effected in the axial direction, owing to the elastic element 40. On the other hand, vibrations are damped in the circumferential direction, since the tool receiver 22 is coupled to the holder 10 in an elastically resilient manner via the torque transmission elements 28, which are guided in the receivers 26, and via the damping elements 34. A high load capacity and, at the same time, a long service life are ensured because the damping elements are supported over a large area, both on the lateral surfaces 18 in the holder 10 and on the side walls of the torque transmission elements 28. A particular advantage of the tool adapter 5 described consists in that the bias of the elastic element 40 and of the damping elements 34 can be set. It is thereby possible to set the frequencies at which a particularly high damping is effected. A maximum of vibration damping can thus be achieved for any desired machining, such that there is a maximum reduction of the noise produced during machining.

As can be seen in FIG. 7, the outside of the damping elements 34 can also be oblique, such that they are supported on the holder via an obliquely aligned bearing contact surface. Suitable angles are in the range from 15° to 75°, 45° being preferred. The effect of the oblique bearing contact surface is that the outside of the damping elements is subjected not only to compression, but also to shear, this being advantageous for vibration damping.

While a specific embodiment of the invention has been described in detail, it will be appreciated by those skilled in the art that various modifications and alternatives to the details provided herein could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A tool adapter comprising:
a holder structured to be attached to a machine tool; and
a tool receiver structured to receive a portion of a rotary cutting tool therein, the tool receiver being mounted in the holder,
wherein the tool receiver is mounted in the holder so as to be elastically resilient in the axial direction,
wherein the tool receiver is disposed inside an opening of the holder, which opening is open at an end face of the holder, and
wherein a clamping element is provided on the end face of the holder, the clamping element pressing the tool receiver into the opening.

2. The tool adapter of claim 1, wherein at least one elastic element is provided axially between an end face of the tool receiver and at least an end face of an inner portion of the holder, such that the tool receiver is received in the holder so as to be elastically resilient in the axial direction.

3. The tool adapter of claim 1, wherein the tool receiver is realized as a bushing, which is mounted without play in the opening of the holder.

4. The tool adapter of claim 1, wherein a bearing ring is disposed within the holder axially between the clamping element and the elastic element, and wherein the bearing ring is structured to bias the elastic element a predetermined amount.

5. The tool adapter of claim 1, wherein a torque transmission element is provided which acts positively between the tool receiver and the holder.

6. The tool adapter of claim 1, wherein a damping element is provided which acts in the circumferential direction between the tool receiver and the holder.

7. The tool adapter of claim 6, wherein the damping element surrounds the torque transmission element in the manner of a ring.

8. The tool adapter of claim 5, wherein the torque transmission element is fixedly coupled to the tool receiver in the circumferential direction and projects into a cutout formed in the holder whose dimensions, at least in the circumferential direction, are greater than the dimensions of the torque transmission element.

9. The tool adapter of claim 6, wherein the torque transmission element is arranged so as to be settable, such that the bias exerted upon the damping element can be altered.

10. The tool adapter of claim 9, wherein the torque transmission element widens outwardly, such that it can exert a bias upon the damping element in the radial direction.

11. The tool adapter of claim 5, wherein the torque transmission element engages in a receiver formed in the tool receiver.

12. The tool adapter of claim 5, wherein the torque transmission element is coupled to the tool receiver via a number of screws.

13. The tool adapter of claim 5, wherein a plurality of torque transmission elements are provided, disposed in a distributed manner around the center axis of the tool adapter.

14. The tool adapter of claim 5, wherein a sleeve is provided which generally surrounds the holder.

15. A tool adapter comprising:
a holder structured to be attached to a machine tool; and
a tool receiver structured to receive a portion of a rotary cutting tool therein, the tool receiver being mounted in the holder,
wherein the tool receiver is mounted in the holder so as to be elastically resilient in the axial direction,
wherein a torque transmission element is provided which acts positively between the tool receiver and the holder, and
wherein the torque transmission element is realized in the manner of a feather key.

* * * * *